March 15, 1938.    A. H. WALDE    2,111,107
BATTERY CABLE AND CONNECTER
Filed July 25, 1936    2 Sheets-Sheet 1
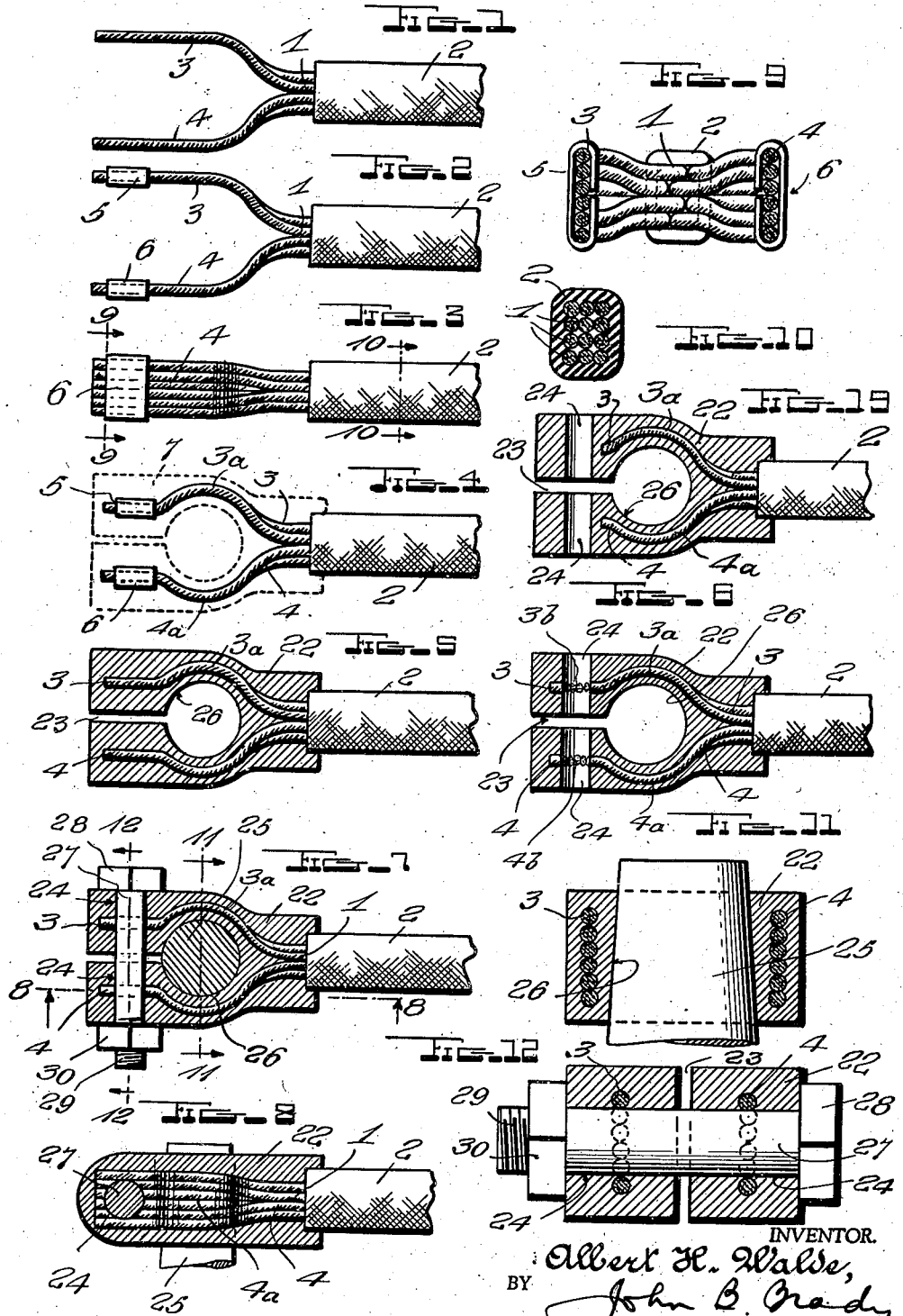
INVENTOR.
Albert H. Walde,
BY John B. Brady
ATTORNEY.

March 15, 1938.   A. H. WALDE   2,111,107
BATTERY CABLE AND CONNECTER
Filed July 25, 1936   2 Sheets-Sheet 2
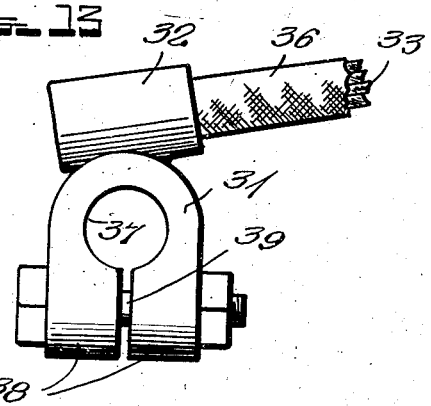
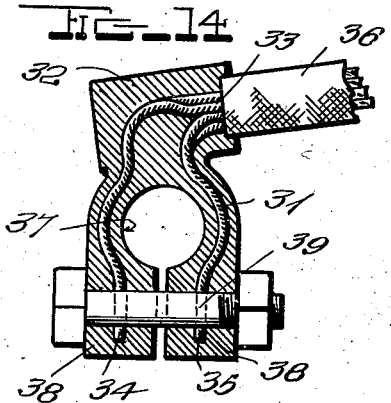
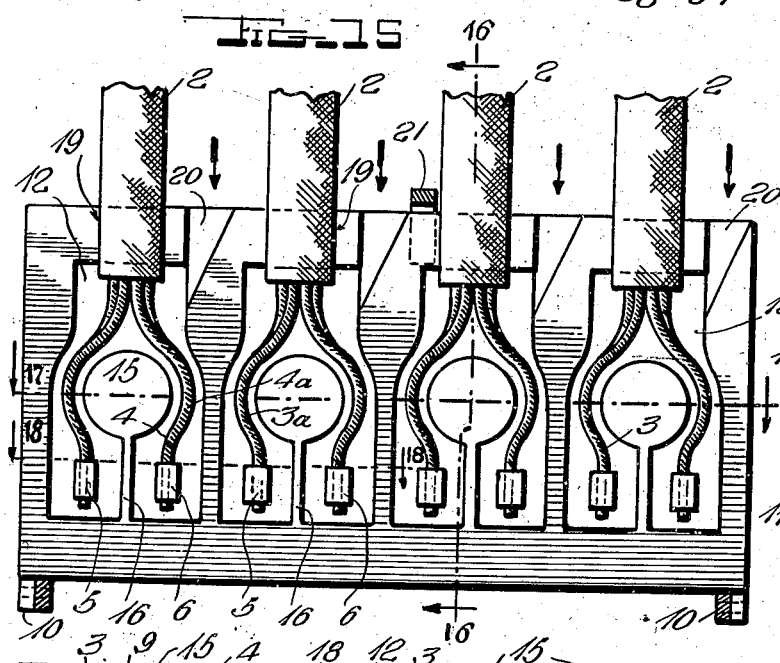
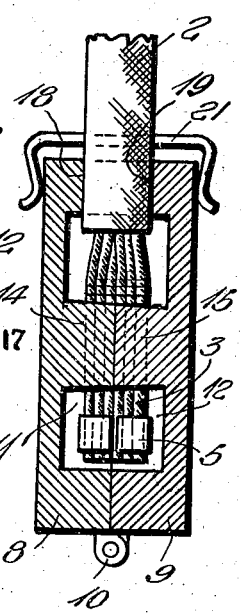
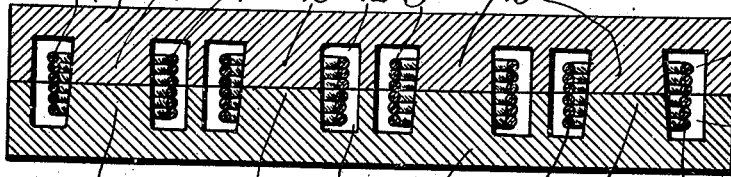
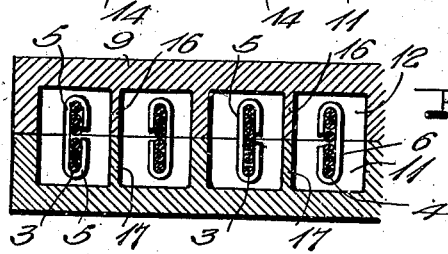
INVENTOR.
Albert H. Walde,
BY John O. Brady
ATTORNEY.

Patented Mar. 15, 1938

2,111,107

UNITED STATES PATENT OFFICE 2,111,107

BATTERY CABLE AND CONNECTER

Albert H. Walde, Philadelphia, Pa., assignor, by direct and mesne assignments, of one-third to Arnold Berman, Philadelphia, Pa., and one-third to Carrie E. Hohl, Upper Darby, Philadelphia, Pa.

Application July 25, 1936, Serial No. 92,650

1 Claim. (Cl. 173—259)

My invention relates broadly to battery cables and connecters and more particularly to a construction of improved battery cable and connecter having a high degree of strength and high electrical conductivity.

One of the objects of my invention is to provide a construction of battery cable and connecter in which the stranded wires of the cable are embedded in the material forming the jaws of the connecter which embrace the storage battery post for imparting a high degree of tensile strength and low electrical resistivity.

Another object of my invention is to provide a construction of non-corrosive battery cable and connecter having a minimum number of parts substantially free from detrimental effects of corrosion and eliminating the necessity of establishing a separate connection between the connecter and the cable.

Still another object of my invention is to provide a construction of connecter for storage battery posts in which the metal forming the connecter may be cast directly around the stranded ends of a cable having the ends thereof spread and shaped to conform with the contour of the storage battery post with which the connecter is designed to cooperate.

A further object of my invention is to provide a construction of connecter for storage battery posts in which the stranded ends of a cable are preformed to conform with the shape of the storage battery post with which the connecter is designed to coact and non-corrosive metal cast directly around the cable so that the stranded portions of the cable form the core of the jaws of the connecter thereby imparting a high degree of tensile strength and relative resilience to the jaws facilitating the insertion and removal of the connecter from the storage battery post.

A still further object of my invention is to provide a method of making a connecter, having stranded wire cored jaws, for storage battery posts in which a multiplicity of connecters may be made simultaneously by process of casting inexpensively on a quantity production basis.

Other and further objects of my invention reside in the process of making electrical connecters and the improved construction thereof as set forth more fully in the specification hereinafter following by reference to the accompanying drawings in which:

Figure 1 is a top plan view of a portion of a battery cable, the strands comprising the cable being spaced apart to form the stranded core of the jaws of the connecter in substantially the shape which they assume when embedded within the cable terminal; Fig. 2 is a similar view with low melting point metallic form retaining bands applied to the ends of the strands to confine and substantially align the strands during the process of casting; Fig. 3 is a side elevation thereof; Fig. 4 is a top plan view of the cable terminal with the terminal connecter shown in dotted lines; Fig. 5 is a similar view showing the strands embedded within the cable connecter, the low melting point metallic bands encircling the ends of the strands having melted and become an integral part of the molded battery terminal casting; Fig. 6 is a view similar to Fig. 5 showing the bifurcated ends of the terminal drilled to receive the securing bolt; Fig. 7 is a similar view showing the battery terminal provided with the clamping bolt and fastened to a conventional storage battery post; Fig. 8 is a sectional view taken substantially on line 8—8 of Fig. 7; Fig. 9 is a transverse vertical section taken on line 9—9 of Fig. 3; Fig. 10 is a transverse vertical section taken on line 10—10 of Fig. 3; Fig. 11 is a transverse vertical section taken on line 11—11 of Fig. 7; Fig. 12 is a similar view taken on line 12—12 of Fig. 7; Fig. 13 is a top plan view showing the cable provided with an offset connecter, substantially at right angles to the cable; Fig. 14 is a similar view showing the connecter in horizontal section; Fig. 15 is a sectional view showing a plurality of cables clamped within the halves of a mold ready to receive the molten metal; Fig. 16 is a transverse vertical section taken on line 16—16 of Fig. 15; Fig. 17 is a horizontal section taken substantially on line 17—17 of Fig. 15; Fig. 18 is a horizontal section taken on line 18—18 of Fig. 15; and Fig. 19 shows a modified form of terminal embodying my invention.

My invention is directed to an improved construction of cable connecter for storage battery terminals. I provide a special construction of stranded flexible cable which is substantially flat and substantially rectangular in cross section. The rectangular structure of cable is covered by insulation material which substantially conforms in contour to the structure of the cable. The relatively flat stranded conductor constituting the cable is separated into two substantially equal portions which are spread to substantially conform with the shape of the coacting jaws of the finished terminal connecter.

For purposes of maintaining the form of the separated portions of the stranded conductor, I provide an encircling band of metal having low melting point adapted to normally embrace and confine the strands in separated portions. The cable thus prepared is laid in position in a mold. The mold may be of a variety of forms as the method of my invention is adapted for die casting as well as permanent mold casting and poured mold operations. The construction of the mold is such that preformed recesses are provided in opposite coacting portions of the mold for shaping the battery terminal. The coacting portions of the mold, defining the shape of the terminal by means of the aligned recesses, is adapted to receive the prepared battery cable. The separated portions of the stranded wire forming the cable are of such length as to extend substantially the entire length of the finished battery terminal. The separated stranded portions of the cable, each confined in position by the band wrappers of low melting point metal, extend around the central portion of the coacting recesses in the aligned parts of the mold and upon opposite sides of that portion of the terminal, which ultimately forms the central aperture which receives the storage battery post. The insulation covering the stranded cable extends to a position substantially within the limits of the coacting recesses in the aligned parts of the mold. Accordingly, when the metal is flowed in, the cable connecter is formed directly around the separated stranded portions of the cable conductor and directly around the end of the insulation forming a permanent unitary construction of high electrical conductivity and low resistivity. The cylindrical bore in the jaws of the storage battery connecter through which the securing bolt is adapted to extend is drilled through the aligned jaws. The drill cuts through not only the molded metal of the terminal but also through the stranded conductors of the cable. There is thus obtained substantial electrical conductivity, substantially the entire length of the terminal connecter. This construction imparts not only good electrical conductivity to the terminal but also mechanical strength and a high degree of resiliency. Thus the jaws of the terminal may be clamped with respect to the storage battery post when securing the cable in position and spread when removing the cable from the storage battery post.

Because of the resiliency imparted to the jaws of the terminal by the embedded stranded conductors of the cable, I depend much less upon the inherent resiliency of the cast metal forming the terminal. In some instances, however, I employ a composition material of antimony, tin, copper and lead which in itself provides a material of relatively high resiliency. A wall structure substantially the height of the terminal is formed on either side of the recess through which the storage battery post projects by the separated portions of the flexible cable conductor. The spread portions of the flexible cable conductor thus impart substantial strength to the terminal.

I eliminate connecting devices between the end of the cable and the terminal by directly forming the terminal on the spread portions of the cable thus eliminating undesirable corrosive action so prevalent in storage battery terminals. A loose connection cannot develop between the cable and the terminal because the cable becomes an intimate part of the terminal in the structure of my invention.

The confining means or clips around the ends of the separated portions of the cable, and which are cast into the jaws of the terminal, are of material having a relatively low melting point. Under the intense heat developed in the molding process, these clips lose their identity and flow into the material constituting the molded jaws of the terminal.

The molded embedded wire terminal construction of my invention is adapted both to the elbow type terminal and the straight type terminal as well as to various forms of angularly disposed lug and strap type terminal connecters.

The important consideration in all of these forms is that the portions of the stranded conductors shall extend substantially the entire length of the terminal and around the jaws which clamp the terminal to the storage battery post.

Referring to the drawings in more detail, reference character 1 designates the flexible stranded electrical conductor constituting the storage battery cable. The flexible conductor 1 is formed by a plurality of separate strands. Each strand is formed by a multiplicity of twisted relatively fine wire conductors. The strands constituting the cable are grouped in substantially rectangular cross-section. The substantially rectangular cross-section cable is covered by flexible insulation material indicated at 2. The insulation material 2 is cut away adjacent the end of the cable, leaving the flexible strands forming the cable bare. The flexible strands are separated into equal portions represented at 3 and 4. The separate portions of the flexible cable are shaped to conform substantially with the contour of the jaws of the connecter when finally completed. That is to say, the strands 3 and 4 are separated in spaced relation to form a substantially solid vertical wall or core structure. In order to maintain the form of the spread and separated portions of the cable at 3 and 4, I provide metallic bands having the characteristic of low melting point, which bands encircle the core formed by the conductors at 3 and 4. The metallic bands are shown in Figs. 2, 3, 4, 9, 15, 16 and 18 at 5 and 6. The metallic band 5 embraces the strands 3 and has sufficient rigidity to maintain strands 3 in a substantially vertical plane constituting a wall or core structure. The band 6 which encircles the flexible conductors 4 similarly maintains the conductors 4 in a vertical plane symmetrically spaced from the plane of the conductors 3 on opposite sides of a central axis through the cable 2. The substantially vertical wall or core structure formed by the separated portions of the flexible cable 3 and 4 is first shaped to conform with the final shape of the jaws of the storage battery connecter indicated in dotted lines in Fig. 4 at 7. That is to say, each of the groups of strands 3 and 4 are shaped as in Fig. 4 by imparting an outwardly extending convex curvature as represented at 3a and 4a in an intermediate position between the extremities of the conductors and the end of the insulation material at 2. The extreme outer ends of the conductors at 3 and 4 remain in parallel spacial relation clamped by the low melting point metallic clips shown at 5 and 6.

The shaped end of the cable is now ready for the mold. The mold is shown more particularly in Figs. 15–18 as comprising a pair of coacting sections 8 and 9. The coacting sections of the mold are hingedly connected as indicated at 10 and are adapted to be closed with respect to each other to provide aligned metal receiving portions indicated at 11 and 12. The aligned metal receiving portions of the mold are shaped to the contour of the connecter which is finally produced. It will be seen that the coacting sections of the mold 9 and 10 carry central core portions 14 and 15 adapted to be aligned with each other when the mold sections are closed. The core portions 14 and 15 are each tapered so as to provide the required tapered bore in the connecter which fits around the storage battery post. The coacting core portions 14 and 15 are connected with the coacting parts of the mold through webs 16 and 17 which provide means in the mold for forming the gap between the ends of the jaws of the connecter. The coacting parts of the mold each have a semi-cylindrical recess in the aligned interior faces thereof as indicated at 18 and 19 to allow the insulation 2 of the cable to be clamped between the coacting parts of the mold. The cable is so located in the mold that the insulation 2 projects interiorly into the mold so that when the metal flows into the mold, the metal will flow wholly around the insulation sheathing 2 of the cable forming a protection for the end of the insulation on the cable.

It will be seen that the end of the cable preformed as in Fig. 4 is inserted in position in the multiple mold as shown, for example, in Fig. 15. The portions of the cable at 3 and 4 are separated to extend substantially through a central zone in each of the recesses in the coacting parts of the mold with the low melting point metallic clips 5 and 6 maintaining the shape of the strands of the cable projecting into the mold. When the ends of the cable are positioned in the mold, as shown in Fig. 15, for example, the non-corrosive metal from which the connecter is formed is ready to be poured into the molds through suitable gates which I have indicated at 20, individual to each of the molds.

The parts 8 and 9 of the mold are maintained in closed aligned position by means of a suitable clamp device which I have indicated at 21. The molten fluid metal flows around the core portions 3 and 4 of the cable and fills the space on either side of the cable and between the side walls of the mold and the wall formed by the portions of the cable 3 and 4 and between the central coacting core portions 14 and 15. The intense heat of the fluid metal melts the metallic bands 5 and 6 so that the metallic bands 5 and 6 lose their identity and flow into the material constituting the molded jaws of the terminal. The condition of the casting just after the molding process is illustrated in Fig. 5 in which the portions of the cable at 3 and 4 are illustrated as forming an extended core for the coacting jaws of the terminal 22 substantially the entire length of the terminal. The terminal 22 is shown having parallel extending spaced faces on either side of the central axis of the terminal.

The terminal 22 is now ready for boring and as illustrated in Fig. 6 a transverse passage is drilled through the jaws of the terminal at 24. This operation actually cuts through some of the conductors of the portions 3 and 4 of the cable as indicated at 3b and 4b in Fig. 6. Nevertheless, sufficient core structure formed by the portions 3 and 4 of the cable remains to impart strength to the jaws of the terminal substantially to the extreme limits of the ends thereof.

The terminal 22 is adapted to be engaged over the storage battery post as indicated in Figs. 7, 8 and 11 at 25. The storage battery post 25 is tapered and the coacting aperture molded in terminal 22 is correspondingly tapered. A clamping bolt 27 extends through the transverse passage 24 in the jaws of the terminal. The clamping bolt 27 has a head 28 on one end and is screw-threaded at 29 on the opposite end to receive nut 30. By turning nut 30 tapered cylindrical side walls 26 of the jaws of the terminal are brought into more intimate engagement with the tapered side walls of the storage battery post 25. Because of the yieldable character of the core structure provided by portions of the cable 3 and 4 embedded in the jaws of the terminal the material of the jaws is sufficiently resilient to facilitate clamping of the terminal on the post and the removal of the terminal from the post by spreading of the jaws.

As heretofore illustrated, the terminal of my invention is constructed in straight form. It will be understood that the principles of my invention are equally applicable to other forms of terminals, one of which I have illustrated in Figs. 13 and 14. In this arrangement the terminal indicated at 31 is provided with an angularly disposed connecting portion 32 through which the stranded portions of the cable 33 extend as illustrated in Fig. 14. The stranded cable 33 has the strands thereof divided into two portions 34 and 35 which form cores for the coacting jaws of the terminal. The cable 33 has the insulation 36 thereof extending into the molded structure of the connecter 32 thereby preventing corrosive attack of acid upon the conductors of the cable. The separated portions of the cable at 34 and 35 extend entirely around central aperture 37 of the connecter and substantially to the ends of the jaws 38 through which the clamping bolt 39 extends.

In some instances, I construct the terminal in a manner which eliminates the necessity of drilling the transverse passages 24 by casting the metal of the terminal directly around a transverse core member. A terminal constructed in this manner is shown in Fig. 19. It will be seen that the strands 3 and 4 of the conductor are allowed to terminate short of the transverse passages 24 in this construction and thus avoid obstruction to the transverse core member. Other strands of the conductor may extend beyond, above and/or below, the passages 24, as in the other forms of my invention.

Inasmuch as the copper wire, forming the strands of the cable forms a relatively large portion of the jaws of the connecter, the composition of the terminal of my invention, though including an alloy poured in the proportion of approximately 84% lead, 2% copper, 5% tin and 9% antimony, actually consists, when in cast form, of approximately 15% lead, 5% tin and antimony and 80% copper. The presence of such a large amount of copper throughout the jaws of the connecter greatly increases the electrical conductivity of the connecter and reduces resistivity thereby increasing the efficiency of the cable. It will be understood that the copper wire does not enter into the alloy forming the cast, but is considered included in the 80% copper noted in the completed terminal on a simple quantitative basis only; that is, the 80% noted includes the large amount of free copper in the wires and the small percentage contained in the alloy. As the free copper constitutes a large portion of the completed terminal, the quantity of alloy, and the proportions of its components, are relatively reduced.

I have found the construction of the cable and connecter of my invention highly practical for inexpensive manufacture on a quantity production basis. I realize that other modifications in the construction and arrangement may be made and I do not intend that my invention herein be limited to the particular forms of cable and connecter and method of making the same as herein described and I desire that it be understood that modifications may be made and that no limitations upon my invention are intended other than may be imposed by the scope of the appended claim.

What I claim as new and desire to secure by Letters Patent of the United States is as follows:

The method of making a storage battery terminal which comprises baring the ends of an insulated stranded cable, dividing the stranded ends of the cable into two symmetrical portions disposed in substantially parallel planes on opposite sides of a central axis extending through the cable, confining the strands of the cable forming the said symmetrical portions by metallic bands of low melting point characteristic, shaping the symmetrical portions of the strands to substantially conform with the contour of a storage battery post, centering the preformed cable in a shaped mold, pouring molten metal into the shaped mold and around the preformed cable for melting the low temperature bands and forming a terminal directly around the strands of the cable.

ALBERT H. WALDE.